(12) United States Patent
Ballester

(10) Patent No.: US 6,439,337 B1
(45) Date of Patent: Aug. 27, 2002

(54) STEERING MECHANISM ASSEMBLY FOR AUTOMOTIVE VEHICLES

(75) Inventor: Adrian Jose Ballester, Buenes Aires (AR)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/547,972

(22) Filed: Apr. 12, 2000

(30) Foreign Application Priority Data

Jun. 17, 1999 (AR) ..................................... P99/01/02911
Dec. 4, 1999 (AR) ..................................... P99/01/01679

(51) Int. Cl.[7] .................................................. B62D 5/06
(52) U.S. Cl. .................. 180/427; 180/428; 280/93.514; 74/409
(58) Field of Search ................................. 180/427, 428, 180/444; 280/93.514; 74/388 PS, 409

(56) References Cited

U.S. PATENT DOCUMENTS

| 3,593,593 A | * | 7/1971 | Bradshaw | 74/498 |
| 3,753,375 A | * | 8/1973 | Colletti | 74/498 |
| 4,263,817 A | * | 4/1981 | Taig | 74/422 |
| 4,614,127 A | * | 9/1986 | Elser | 74/422 |
| 4,809,806 A | * | 3/1989 | Pietrzak et al. | 74/388 PS |
| 5,509,494 A | * | 4/1996 | Lang | 74/388 PS |
| 6,000,491 A | * | 12/1999 | Shimizu et al. | 180/444 |
| 6,247,375 B1 | * | 6/2000 | Gierc et al. | 74/388 PS |

* cited by examiner

*Primary Examiner*—Daniel G. DePumpo
(74) *Attorney, Agent, or Firm*—John Kajander

(57) ABSTRACT

A pinion adjustable assembly for steering mechanisms for automotive vehicles, a pinion-rack set incorporated in a pinion housing and a tubular cylindrical bushing with free angular displacement that is positioned inside the housing and is coupled to an angular positioning nut. The said bushing has an eccentric inner wall with regard to outer wall surface surrounding a pinion housing. Angular displacement of said bushing by angular movement changes its eccentricity to allow the pinion to move relative to the rack bar for overcoming wearing out effect on teeth.

8 Claims, 3 Drawing Sheets

STEERING MECHANISM ASSEMBLY FOR AUTOMOTIVE VEHICLES

RELATED APPLICATION

The present invention claims priority based on Argentina Patent Application Serial No. P99/01/01670, filed Apr. 12, 1999 and P99/01/02911, filed Jun. 17, 1999

FIELD OF THE INVENTION

The present invention relates generally to a steering mechanism assembly for automotive vehicles, and more particularly to rack and pinion steering mechanisms.

BACKGROUND OF THE INVENTION

An important requirement for steering mechanisms for automotive vehicles, particularly pinion-rack bar power-assisted mechanisms, is offering stable steering means with precise movement between a pinion and a rack bar. This may be accomplished by providing a proper gear teeth assembly with proper contact points. This is achieved by mounting the components within established limits of tolerances. Sometimes, the tolerances vary out of established limits during the manufacturing process and to create an undesirable clearance between the gear teeth. Commonly, the correction usually involves additional complicated and time-consuming operations.

Moreover, the steering gear teeth are subject to wear over the life of the vehicle. The wear may adversely affect the assembly relationship since clearance between the teeth creates undesirable noises and improper alignment of vehicle relative to the steering wheel.

Undesirable operation of pinion-and-rack bar set is obtained when teeth are worn out. Wear is created by axial stresses present in the articulations of the steering housings. These stresses tend to urge the rack into a position distant from and out of proper assembly with the pinion. Thus, these stresses create a force opposed to maintaining the pinion and rack bar teeth in tight engagement.

The above cited teeth clearance is usually solved or compensated for by applying a force to a pinion roller bearing and rack bar and dampening by using an adjustment washer and pushing spring to urge the pinion and rack bar together for a proper assembly relationship.

Proper alignment and adjustment during manufacturing process of this mechanism, as well as wear corrections of the assembly between pinion and rack bar, is difficult in the prior known method.

Also, the source of the problem is hard to determine and sometimes requires the replacement of the complete steering unit.

It would therefore be desirable to improve the assembly relationship between teeth of said pinion-and-rack set. More particularly, it would be desirable to provide an adjustable assembly between the teeth for reducing bothersome noises and the above-mention knocking effects.

SUMMARY OF THE INVENTION

One object of the present invention is to improve the above cited pinion-rack bar mechanisms to enable adjustment of the relative position of teeth gears of the pinion-and-rack bar assembly in a fast and easy manner.

Another object of the present invention is to provide a novel pinion assembly of a steering mechanism that allows a periodical adjustment of pinion-rack bar assembly relationship so that the rotational movement of steering wheel is converted into reciprocal linear movement of rack which results in reduced effort with reduced steering.

Another object of the present invention is to provide a steering mechanism that allows selectively adjustable assembly of pinion-rack bar set inside a pinion casing integral to rack bar casing. The angular shifting of the mechanism avoids an excessive clearance in the pinion-rack bar assembly and allows a radial placement of the pinion for a proper transmission movement. Improper variations of the pinion clearance act against a uniform assembly relationship.

In one aspect of the invention, a tubular sleeve or bushing is positioned inside the casing that is fixed to rack bar casing. The cylindrical outer surface of the bushing is concentric and coaxial to the pinion casing. The inner surface of the bushing is eccentric. The tubular sleeve or bushing is capable of being radially moved in response to angular shifting of the bushing inside the casing to achieve a proper positioning of pinion and rack bar teeth by adjusting the eccentricity of the bushing outer surface relative to the pinion.

In another aspect of the invention, a tubular sleeve or bushing having an outer surface eccentric with regard to a rack casing has an upper end flange for manually or mechanically varying its outer eccentricity. It is also provided with an inner end nut for fixing it in a proper position against the casing. At the same time the rack is engaged to the pinion, an outer elastic buckling seal for resting against the inner concentric surface of the tubular sleeve or bushing absorbs eccentricity differences of the bushing when it is rotated for compensating for preloading the pinion and for assembly differences and for maintaining the rack in contact against the concentric inner surface.

One feature of the present invention is to provide improvements in steering mechanism casings offering the possibility of positioning the pinion by a simple angular displacement of a tubular sleeve or bushing when excessive clearance in the assembly relationship is detected due to teeth wear effects or manufacturing assembly failures.

The present invention is related to improvements in a steering mechanism casing for obtaining a proper adjustment in the assembly relationship between pinion and rack bar of the mechanism. In order to achieve the goal, a novel assembly with new improved characteristics is proposed for the pinion inside the casing. By using the proposed invention the pinion may be fixed to the torque bar of vehicle's steering column in an assembly relationship with the rack bar.

This assembly allows a selective regulation of pinion axial positioning with regard to the rack bar and in response to teeth improper clearance generated by deficient adjustment during assembly of the casing or by a functional wear effect on the assembled means, thus compensating assembly differences and avoiding undesirable pounding effects on steering command during driving.

The adjustment is achieved by incorporating a bushing or sleeve telescopically assembled inside the casing and fixed to the rack bar casing with free angular clearance. The bushing has an upper flange for resting on the upper edge of the rack, and an outer thread in its lower edge for a roller nut against the lower edge for fixing the bushing in a proper position.

The bushing or tubular sleeve has a cylindrical outer surface coaxial to the rack inner surface, and an inner surface eccentric with regard to the outer surface of the bushing that delimits a movement area of a tubular retention and torsional supporting rack for the torque bar (pinion) end of vehicle's steering column.

The lower end of the tubular rack is held or retained against a bushing or sleeve by a "seeger" type washer which avoids axial movements of the rack but allows angular displacements of same in response to torsional loading leaving the rack in contact to the eccentric surface of the bushing through end resilient buckling washers which allow a frictional contact with the surface.

By unscrewing the lower retention nut of the bushing an angular displacement of bushing is allowed and therefore the eccentricity of bushing inner surface could be varied transversely with regard to the axis of same, generating a repositioning movement of torque bar axis as well as a pinion approaching to rack bar thus obtaining a desired adjustment of teeth clearance.

Other objects and features of the present invention will become apparent when viewed in light of the detailed description of the preferred embodiment when taken in conjunction with the attached drawings and appended claims.

DESCRIPTION OF THE PREFERRED EMBODIMENTS

The present invention is described with respect to a power steering mechanism. Those skilled in the art would recognize the present invention is applicable to various rack and pinion steering systems such as electric, manual, electrohydraulic, and hydraulic.

Figure 1:
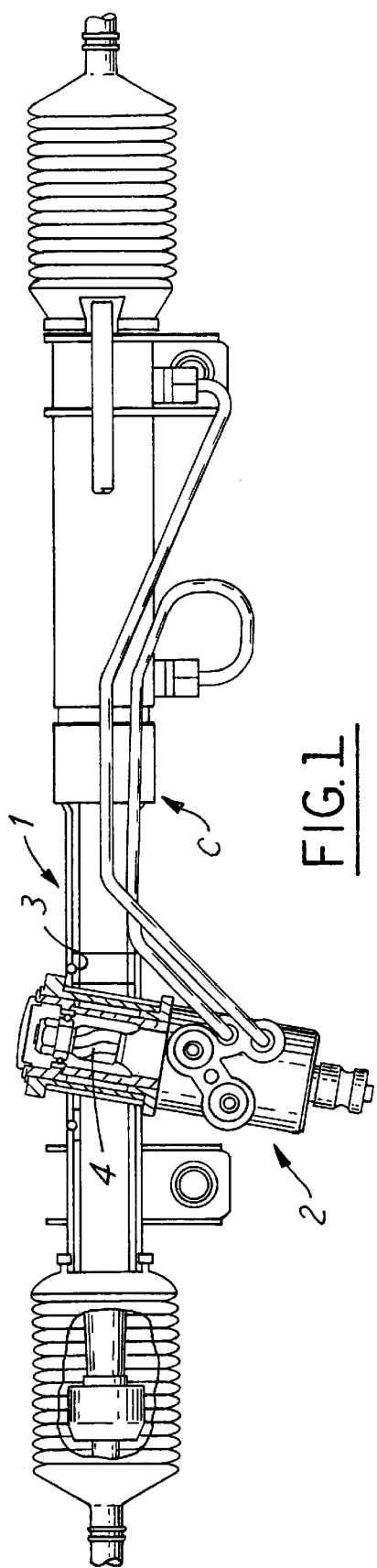
FIG. 1 represents a general plan view of a pinion-rack bar mechanism of a power-assisted steering incorporating the improvements of the present invention.
Figure 3:
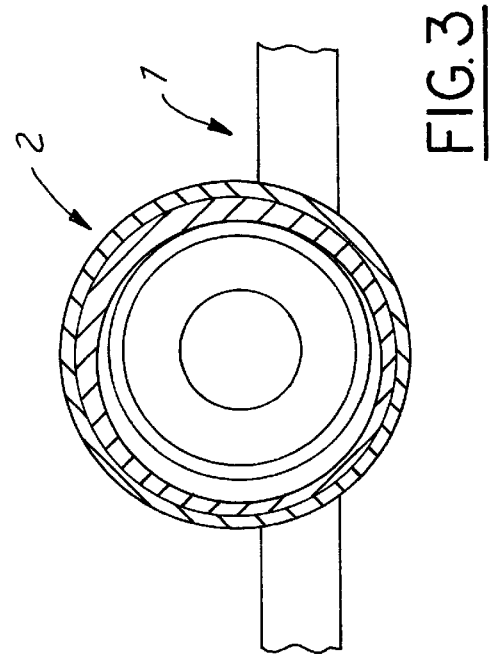
FIG. 3 shows another schematically sectional view of FIG. 1 showing bushing eccentricity as well as the functional relationship with regard to tubular rack of torque bar end including the pinion.
Figure 2:
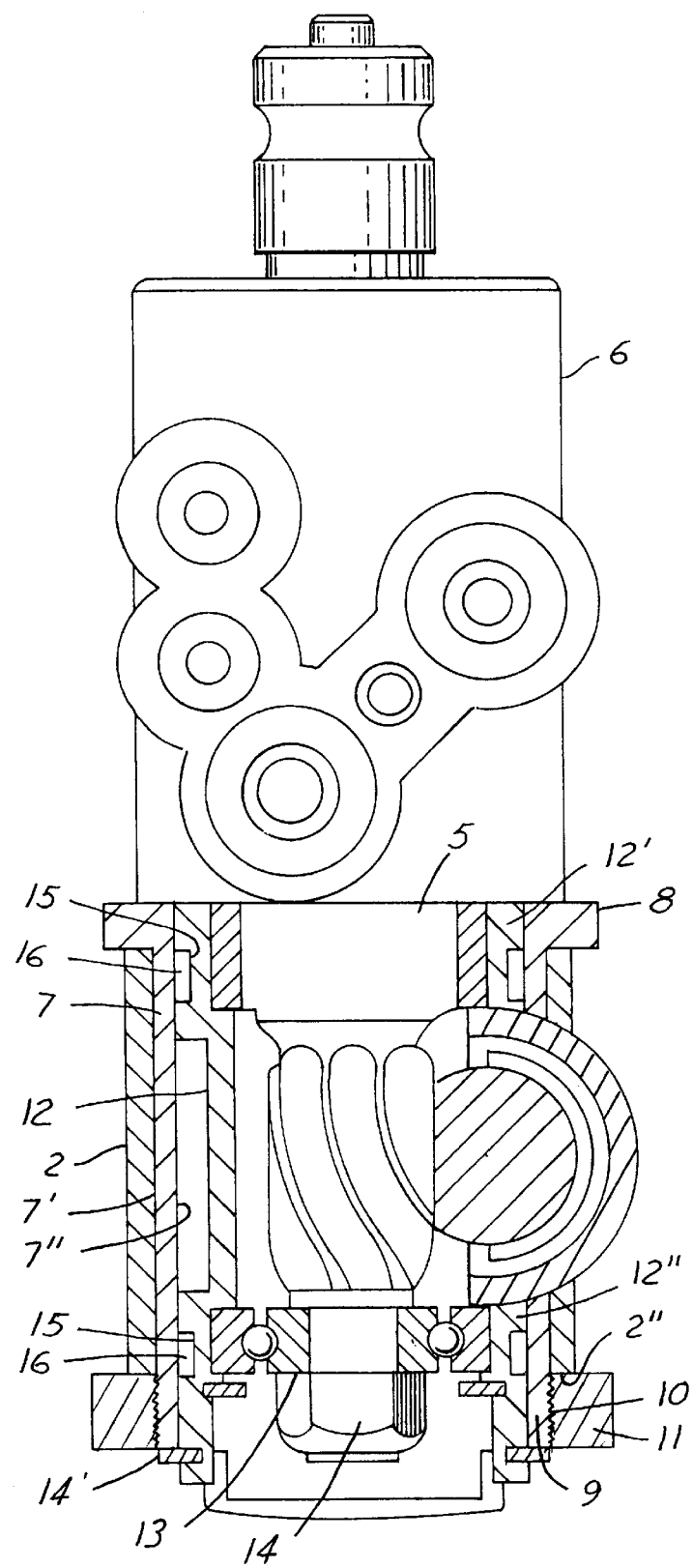
FIG. 2 represents a schematic cross-section showing the assembly of the present invention.

As illustrated in FIGS. 1–3, the improvements proposed by the present invention comprise a steering mechanism incorporated in a casing (c) (see FIG. 1) comprising as is already known in the art a rack bar casing 1 and a pinion casing 2 that is traversely arranged with regard to the casing 1 where rack bar 3 is mounted in relation with pinion 4 integral with a pinion shaft or torque bar 5. The torque bar 5 may be used to drive valve means 6 of steering column in a hydraulic application. These components are not described in detail as they are known in the steering mechanisms art.

In accordance with the present invention, pinion casing 2 includes an assembly for adjusting teeth assembly relationship of rack bar 2 and pinion 4 as is clearly shown in FIGS. 2 and 3.

The teeth assembly is defined by a tubular sleeve or bushing 7 telescopically arranged in the pinion casing 2 for allowing angular displacement of the bushing with regard to the inner surface of casing 2.

The tubular sleeve or bushing 7 includes an outer cylindrical surface 7' concentrically and coaxially arranged with regard to casing 2, and an inner surface 7" eccentrically arranged with regard to outer surface 7'. This bushing 7 has a variable thickness wall as is clearly shown in FIG. 3.

The bushing 7 also has an upper holding flange 8 against upper edge 2' of casing 2 and a lower projecting end portion 9 which is projected from inner edge 2" of casing 2 that includes a thread 10 for screwing in a fixing nut 11 of bushing 7 against the lower edge 2" of rack 2. Thus, this nut 11 allows fastening the bushing 7 in an angular desired position.

Inside bushing 7 a pinion housing 12 is concentrically arranged with regard to cylindrical lower surface 7" which in turn is concentrically arranged with regard to outer surface 7'. The pinion housing 12 is fastened to torque bar 5 through its upper end including a bearing 13 in its lower end for torque bar end 5, that is fastened by a nut 14 so that the bearing 13 absorbs torsional stresses when the steering mechanism is driven by rotational movements of vehicle's steering wheel.

Pinion housing 12 is fastened against bearing lower end by a "seeger" type washer 14 having annular ridges 12'–12" with annular grooves 15 for respective square-cross section elastic buckling seals or rings 16b permanently rested against eccentric cylindrical inner surface 7" of bushing 7. Rings 16 help preload the pinion assembly with a force during assembly.

Regulation of between-teeth clearance of rack bar 3 and pinion 4 is achieved as follows: nut 11 is unscrewed so that bushing 7 is freed. Using upper flange 8, bushing 7 may be angularly moved (rotated) provoking a positioning movement of eccentric cylindrical inner surface 7" from a first position relative to casing 2 (See FIG. 3). The positioning movement produces a corresponding radial movement (to a second position) in the pinion housing 12 which is fastened to torque bar 5 to vary the assembly relationship of pinion teeth with regard to rack bar teeth.

As can be appreciated from the attached figures, the assembly regulation is produced by varying the eccentricity of inner surface 7" of bushing 7 provoking the radial repositioning of the pinion housing 12.

Figure 5:
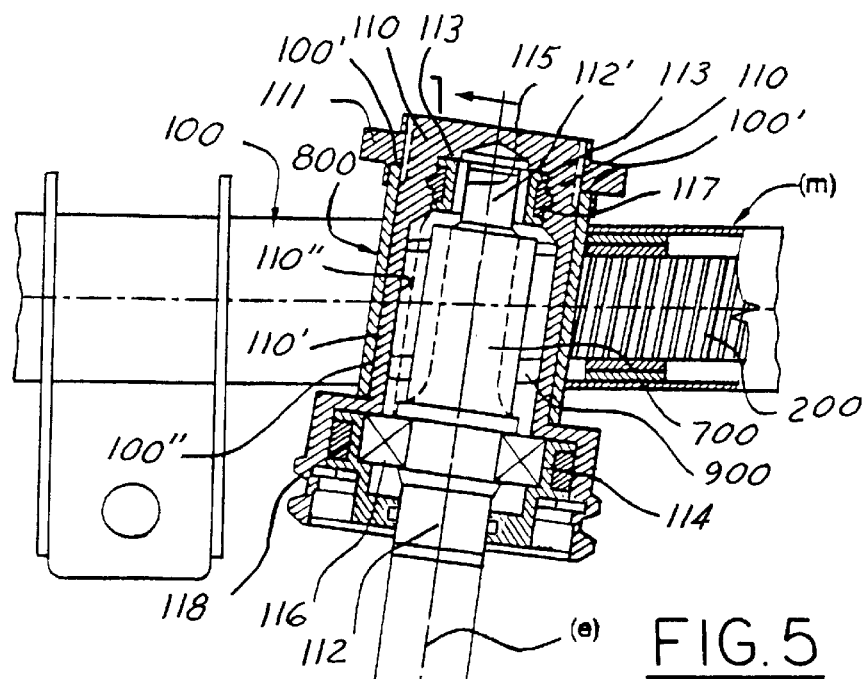
FIG. 5 shows a schematically longitudinal section view of the proposed assembly of FIG. 4 inside a casing housing of the mechanism.
Figure 4:
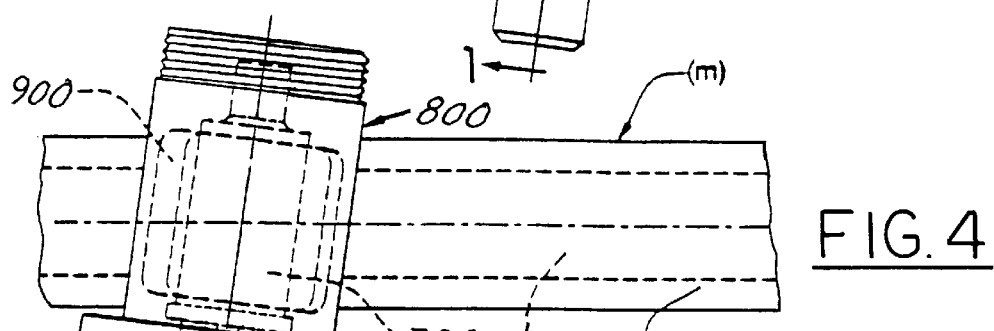
FIG. 4 shows a schematic plan view of an alternative embodiment of a power steering mechanism for automotive vehicles incorporating the novel assembly of the present invention.
Figure 6:
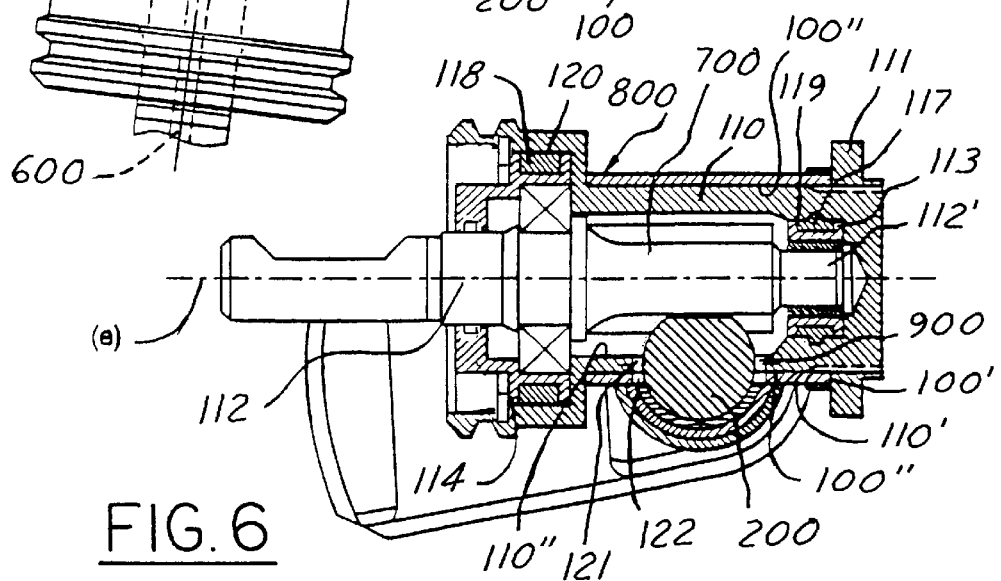
FIG. 6 shows a transverse cross-sectional view of FIG. 5 showing bushing eccentricity.

Referring now to FIGS. 4–6, an alternative embodiment of the present invention is illustrated.

In accordance with the attached drawings, particularly with reference to FIG. 4, a steering mechanism (m) is shown which comprises a rack bar casing 100 where the rack bar 200 is assembled, in relation with a pinion (not illustrated) of a powering cylinder feeding by conduits from valve related to a vehicle's steering column through a torque bar 600. The torque bar 600 includes a pinion 700 assembled inside casing housing 800 which forms an integral part of the rack bar casing 100 and having an aperture 900 through which pinion 700 and rack bar 200 are assembled.

In accordance with the present alternative embodiment of the present invention, inside casing housing 100 a cylindrical tubular bushing 110 is concentrically assembled that is projected from upper flange 100' of casing housing 100 and which is related to a rotating dragging nut 111 for dragging bushing 110. The "dragging" action is achieved by manually driving the nut 111.

Bushing 110 has a cylindrical lateral surface 110' with a free rotating contact against inner surface 100" of casing 100 and an inner surface 110" eccentric with regard to the bushing axis (e).

Inside the bushing 110 is freely mounted a portion 112' of piece 112 which includes supporting racks 113 and 114 for torque bar 106 formed by bushing 115 and bearing 116, supported on rubber rings 117 and 118 of proper hardness in seats 119 and 120 of piece 112 leaving pinion 107 arranged between seats 119–120. Casing wall 110 and piece 112 having apertures 121–122 coincident with aperture 109 of housing wall 100, for relating pinion 107 and rack bar 102.

The way in which pinion 700 is regulated is by screwing or unscrewing nut 111 which in turn determines a radial variation of inner surface 110' eccentricity of bushing 110 producing a radial movement of piece 112 approaching pinion 107 to rack bar 102 in order to achieve a proper assembly relationship between them when an excessive clearance between teeth is detected.

Moreover, rings 117 and 118 are made of elastic buckling material to absorb differences between pinion 700 and rack bar 200 to reduce noises and pounding usually found in this kind of mechanisms.

While particular embodiments of the invention have been shown and described, numerous variations alternate embodiments will occur to those skilled in the art. Accordingly, it is intended that the invention be limited only in terms of the appended claims.

What is claimed is:

1. A steering mechanism for an automotive vehicle comprising:
   a pinion shaft having a pinion gear formed thereon;
   a rack casing receiving said pinion shaft and said pinion gear;
   a bushing rotatably coupled to said rack casing and said pinion shaft, said bushing being received within said rack casing, said bushing receiving said pinion shaft therein, said bushing having an inner diameter eccentric with said rack casing, said bushing positioning said pinion shaft with respect to said rack casing in a first position and a second position, said first position urging said pinion gear toward a rack a first distance, said second position urging said pinion gear toward said rack a second distance, said bushing having a first end with a flange integrally formed therein for preventing said bushing from passing through said rack casing in a first axial direction, said bushing having a second end with a threaded fastener integrally formed therein; and
   a nut having an opposing threaded fastener, said opposing threaded fastener being engaged to said threaded fastener of said second end of said bushing so as to prevent said bushing from passing through said rack casing in a second axial direction.

2. A steering mechanism for an automotive vehicle comprising:
   a pinion housing;
   a pinion shaft positioned within said pinion housing, said pinion shaft having a pinion gear formed thereon;
   a rack casing receiving said pinion shaft and said pinion gear;
   a bushing rotatably coupled said rack casing and said pinion housing, said bushing being received within said rack casing, said bushing receiving said pinion shaft therein, said bushing having an inner diameter eccentric with said rack casing, said bushing positioning said pinion housing with respect to said rack casing in a first position and a second position, said first position urging said pinion gear toward a rack a first distance, said second position urging said pinion gear toward said rack a second distance, said bushing having a first end with a flange integrally formed therein for preventing said bushing from passing through said rack casing in a first axial direction, said bushing having a second end with a threaded fastener integrally formed therein; and
   a nut having an opposing threaded fastener, said opposing threaded fastener being engaged to said threaded fastener of said second end of said bushing so as to prevent said bushing from passing through said rack casing in a second axial direction.

3. A steering mechanism as recited in claim 2 wherein said bushing has an outer diameter concentric with said rack casing.

4. A steering mechanism as recited in claim 2 further comprising a bearing rotatably coupling the pinion shaft and the pinion housing.

5. A steering mechanism as recited in claim 2 further comprising a fastener rotatably coupling the pinion shaft and the pinion housing.

6. A steering mechanism as recited in claim 2 further comprising a valve body coupled to said pinion shaft.

7. A steering mechanism as recited in claim 2 wherein said rack casing comprises a tubular cylinder.

8. A steering mechanism as recited in claim 2 further comprising a ring coupled to position said pinion shaft, said ring having an inner ring surface operatively coupled to said pinion shaft and an outer ring surface operatively coupled to said rack casing.

* * * * *